United States Patent
Sun et al.

(10) Patent No.: US 10,879,512 B2
(45) Date of Patent: Dec. 29, 2020

(54) AROMATIC POLYAMIDE POROUS MEMBRANE, METHOD FOR PREPARING AND LITHIUM SECONDARY BATTERY HAVING THE SAME

(71) Applicant: Microvast Power Systems Co., Ltd., Huzhou (CN)

(72) Inventors: Qingjin Sun, Huzhou (CN); Heji Huang, Huzhou (CN); Wei Li, Huzhou (CN); Xiang Li, Huzhou (CN)

(73) Assignee: MICROVAST POWER SYSTEMS CO., LTD., Huzhou (CN)

( * ) Notice: Subject to any disclaimer, the term of this patent is extended or adjusted under 35 U.S.C. 154(b) by 160 days.

(21) Appl. No.: 16/124,180

(22) Filed: Sep. 6, 2018

(65) Prior Publication Data
US 2019/0074500 A1    Mar. 7, 2019

(30) Foreign Application Priority Data
Sep. 7, 2017    (CN) .......................... 2017 1 0800901

(51) Int. Cl.
*H01M 2/16*    (2006.01)
*H01M 10/0525*    (2010.01)
*H01M 2/14*    (2006.01)

(52) U.S. Cl.
CPC ......... *H01M 2/1653* (2013.01); *H01M 2/145* (2013.01); *H01M 2/162* (2013.01); *H01M 10/0525* (2013.01)

(58) Field of Classification Search
CPC ............... H01M 2/1653; H01M 2/162; H01M 10/0525; H01M 2/145
USPC .......................................................... 429/229
See application file for complete search history.

(56) References Cited

U.S. PATENT DOCUMENTS

| 2006/0141238 A1* | 6/2006 | Sasaki ..................... B32B 5/145 428/315.5 |
| 2008/0113177 A1 | 5/2008 | Sueoka et al. |
| 2016/0240830 A1* | 8/2016 | Mizuno ................... B32B 27/08 |

FOREIGN PATENT DOCUMENTS

| CN | 1681875 A | 10/2005 |
| CN | 201506634 U | 6/2010 |
| CN | 102464803 A | 5/2012 |
| CN | 202384420 U | 8/2012 |
| CN | 103242556 A | 8/2013 |
| CN | 108341987 A | 7/2018 |
| EP | 1553130 A1 | 7/2005 |
| JP | 5664022 B2 | 2/2015 |
| TW | I381571 B | 1/2013 |
| WO | 2017/133375 A1 | 8/2017 |

\* cited by examiner

*Primary Examiner* — Gary D Harris
(74) *Attorney, Agent, or Firm* — Cheng-Ju Chiang

(57) ABSTRACT

The present disclosure provides an aromatic polyamide porous membrane having a uniform internal structure. The internal structure of the membrane is a three-dimensional network porous structure with micron-sized pores. The aromatic polyamide porous membrane of the present disclosure has good thermal stability and is especially suitable for a high energy density lithium-ion power battery, and greatly improves the thermal runaway temperature of the battery. The present disclosure further provides a method for preparing the membrane and a lithium secondary battery having the membrane.

17 Claims, 5 Drawing Sheets

AROMATIC POLYAMIDE POROUS MEMBRANE, METHOD FOR PREPARING AND LITHIUM SECONDARY BATTERY HAVING THE SAME

CROSS-REFERENCE TO RELATED APPLICATION

The present application is based on and claims priority of Chinese Patent Application No. 201710800901.2, filed on Sep. 7, 2017. The entire disclosure of the above to identified application, including the specification and claims are incorporated herein by reference in its entirety.

FIELD OF THE INVENTION

The present disclosure relates to an aromatic polyamide porous membrane, a method for preparing the membrane and a lithium secondary battery having the membrane.

BACKGROUND OF THE INVENTION

The lithium-ion battery is composed of a positive electrode, a negative electrode, an electrolyte, a separator, and a housing. The separator acts as the "third electrode" of the battery and is one of the key inner components of the lithium-ion batteries. After absorbing the electrolyte, the separator could isolate the positive electrode from the negative electrode to prevent short circuit and meanwhile allow the mobility of the lithium ions. When the battery is overcharged or its temperature rises, the separator blocks the current conduction through closing its pores to prevent an explosion. Therefore, the separator performance determines the interface structure and internal resistance of the battery, and further affects the capacity, the cycle performance and the charge/discharge current density of the battery, and the separator with excellent performance plays an important role in improving the overall performance of the battery.

The lithium-ion power batteries need to provide higher voltages, more power, and more energy, and need the separator having better performance. First of all, the separator of the power battery should have higher heat resistance, a wider window of shut-down temperature, and better safety performance. Second, the separator of the power battery is required to have higher uniformity, including the uniformity of the thickness, the gas permeability, and the pore size distribution of the separator. Third, the separator of the power battery needs to have better gas permeability while ensuring battery safety. Fourth, the separator of the power battery is required to have better electrochemical oxidation resistance. Fifth, the separator of the power battery needs better electrolyte absorption performance. At present, most separators of the lithium-ion battery are polyolefin separators, which have poor heat resistance, electrolyte absorption performance, and electrochemical oxidation resistance, and could not meet the requirement of the lithium-ion power batteries. Therefore, the manufacturers of the separator began to develop and research upgrade techniques of the separator, mainly focused to modify the existing separator and develop a new separator.

The inventors of the present disclosure are working to develop a porous membrane with high-temperature resistance to improve the safety of the lithium-ion power battery. Aromatic polyamide polymer (such as PPTA, PMIA, PBA, PSA) has high heat resistance and its glass transition temperature is higher than 300° C., its thermal decomposition temperature is up to 560° C., and furthermore, it has high insulation and chemical resistance, and is suitable for being used as the separator of the lithium-ion battery. At present, domestic research institutes have applied aramid as the separator of the lithium-ion battery, such as Chinese Patent Publication/Issue Number CN103242556A and CN202384420U, which disclose the techniques of coating the aromatic polyamide polymer fibers to the surface of polyolefin separators. However, due to be limited by the polyolefin substrate, the application temperature of the separator should not be too high, which limits the application of the separator.

Therefore, in order to reflect the superiority of the aromatic polyamide polymer in the lithium battery field, it is necessary to prepare a porous membrane which is based on an aromatic polyamide polymer substrate and meets the application requirements of the batteries. Currently, porous membranes are typically prepared by non-solvent induced phase separation (NIPS) method. According to the non-solvent induced phase separation method, the separator is prepared in a process of converting a continuous phase polymer solution into a continuous phase three-dimensional macromolecular network gel. However, the aromatic polyamide polymer molecular has a high degree of orientation and a high crystallinity, which makes it easy to form a dense cortical structure, and results in a poor gas permeability of the porous membrane, and further increases the internal resistance of the battery during battery applications. The United States Publication Number US20080113177 discloses that an aromatic polyamide porous membrane can be formed by adding a phase separation controlling agent for preventing the agglomeration of aramid resin, and casting the slurry onto a support member. However, the technique has the following drawbacks: the temperature of the support member and the ambient temperature of the casting membrane forming solution needs to be reduced below 0° C., which increases the energy consumption, and needs to consider the temperature difference between the membrane forming solution and the casting ambient temperature; the temperature difference between the membrane forming solution and the wet bath should be strictly controlled; a poor polymer solvent and a porogen is required to be added to the membrane forming solution which increases the recovery cost of the solvent; the polymer in the membrane forming solution is precipitated on the support member, and a porous membrane having a symmetrical surface structure could not be obtained since it is difficult to control the surface structure of the membrane even if the ambient humidity and temperature are controlled.

SUMMARY OF THE INVENTION

The present disclosure provides an aromatic polyamide porous membrane. The aromatic polyamide porous membrane has a uniform internal structure (it can be shown in the cross-sectional view of the porous membrane of FIG. 6 that the porous membrane has a uniform internal structure). The internal structure is a three-dimensional network porous structure and includes a plurality of micron-sized pores. The three-dimensional network porous structure of the aromatic polyamide porous membrane of the present disclosure is a single piece and the pores at the outer surface of the membrane communicate with the pores inside the membrane. Both surfaces of the porous membrane of the present disclosure have nearly the same structure (including the same porosity and the same pore size).

In an embodiment of the present disclosure, an average pore size at the surface of the aromatic polyamide porous membrane is in a range from 0.4 μm to 1.0 μm. The average pore size at the surface of the porous membrane means the average pore sizes of both of the two surfaces of the porous membrane is within this range. In an embodiment of the present disclosure, an average pore size at the surface of the aromatic polyamide porous membrane is in a range from 0.5 μm to 0.9 μm. In an embodiment of the present disclosure, an average pore size at the surface of the aromatic polyamide porous membrane is in a range from 0.6 μm to 0.9 μm. In an embodiment of the present disclosure, an average pore size at the surface of the aromatic polyamide porous membrane is in a range from 0.5 μm to 0.8 μm. In an embodiment of the present disclosure, an average pore size at the surface of the aromatic polyamide porous membrane is in a range from 0.6 μm to 0.8 μm.

In an embodiment of the present disclosure, the pores distributed in the cross-section of the aromatic polyamide porous membrane are composed of three sets of continuous pore size distributions: SET (I) 30 to 70 nm, SET (II) 8 to 30 nm, and SET (III) 70 to 100 nm. The area occupied by pores of SET (I) is 80% to 97% of the total area of the pores distributed in the cross-section of the aromatic polyamide porous membrane, the area occupied by pores of SET (II) is 1% to 10% of the total area of the pores distributed in the cross-section of the aromatic polyamide porous membrane, and the area occupied by pores of SET (III) is 1% to 5% of the total area of the pores distributed in the cross-section of the aromatic polyamide porous membrane.

In an embodiment of the present disclosure, the pores distributed in the cross-section of the aromatic polyamide porous membrane are composed of three sets of continuous pore size distributions: SET (I) 50 to 70 nm, SET (II) 8 to 50 nm, and SET (III) 70 to 100 nm. The area occupied by pores of SET (I) is 85% to 97% of the total area of the pores distributed in the cross-section of the aromatic polyamide porous membrane, the area occupied by pores of SET (II) is 1% to 10% of the total area of the pores distributed in the cross-section of the aromatic polyamide porous membrane, and the area occupied by pores of SET (III) is 1% to 3% of the total area of the pores distributed in the cross section of the aromatic polyamide porous membrane.

In an embodiment of the present disclosure, the aromatic polyamide porous membrane has a gas permeability of 20 to 350 sec/100 cc. In an embodiment of the present disclosure, the aromatic polyamide porous membrane has a gas permeability of 30 to 200 sec/100 cc.

In an embodiment of the present disclosure, the aromatic polyamide porous membrane has a porosity of 30% to 70%. In an embodiment of the present disclosure, the aromatic polyamide porous membrane has a porosity of 45% to 60%.

In an embodiment of the present disclosure, the aromatic polyamide is at least one selected from the group consisting of poly (p-phenylene terephthalamide), poly(m-phenylene isophthalamide), poly (p-benzamide), and polyphenylsulfone terephthalamide.

The present disclosure further provides a method for preparing an aromatic polyamide porous membrane, comprising: providing an aromatic polyamide solution; extruding the solution to form a liquid film; conveying the liquid film into a gelling bath by a conveying apparatus to form a pre-formed membrane, during the conveying process, two opposite edges along a conveying direction of the liquid film being in contact with the conveying apparatus; extracting the pre-formed membrane from the solvent by an extracting agent to form a porous membrane. The liquid film of the present disclosure is transferred into a gelling bath through a conveying apparatus to form a pre-formed membrane. Except for the two opposite edges along the conveying direction of the liquid film, the other portions of the upper and the lower surfaces of the liquid film are directly in contact with the gelling liquid. This makes the phase transition process of the two surfaces of the liquid film be identical, so that the two surfaces of the porous membrane have almost the same structure.

A transmission chain of the conveying apparatus has a width $L_1$ and the liquid film has a width L. In an embodiment of the present disclosure, the ratio of $L_1$ to L is from 1/8 to 1/20.

The liquid film portion in contact with the transmission chain has a width $L_2$. In an embodiment of the present disclosure, the ratio of $L_2$ to $L_1$ is from 1/5 to 1.

In an embodiment of the present disclosure, the conveying apparatus includes a transmission unit and a carrier unit. The carrier unit conveys the liquid film into the gelling bath by the entrainment of the transmission unit. The carrier unit includes a first carrier and a second carrier. The first carrier and the second carrier respectively contact with the two opposite edges of the liquid film along the conveying direction of the liquid film.

In an embodiment of the present disclosure, the conveying apparatus includes a carrier unit and a transmission unit for conveying the carrier unit. The surface of the carrier unit in contact with the liquid film is a non-planar surface.

In an embodiment of the present disclosure, the surface of the carrier unit in contact with the liquid film includes anti-slip structures and/or liquid storage structures, for forming a carrier surface with a plurality of solid regions and a plurality of non-solid regions between the liquid film and the carrier unit. The carrier unit is used for carrying the liquid film into the gelling bath, and the carrier unit may further be arranged to control its width change during the phase separation process. Meanwhile, except for the opposite edges in contact with the carrier unit, the other portion of the liquid film is suspended in the gelling bath, and the two opposite surfaces of the suspended portion are in full contact with the gelling bath under the same condition, ensuring the two opposite surfaces have the same pore forming conditions, so that the two opposite surfaces of the formed porous membrane have the symmetrical micro-porous structure, which further improves the porosity and the pore quality of the porous membrane.

In an embodiment of the present disclosure, the carrier unit includes two fixing structures for fixing the opposite edges of the liquid film. The fixing structures include needles and/or clips. The fixing structures fix the liquid film to the carrier unit so that the liquid film could enter the gelling bath with the carrier unit under the entrainment of the transmission unit.

In an embodiment of the present disclosure, the surface of the carrier unit in contact with the liquid film is a non-planar surface.

On one hand, the design that the surface of the carrier unit is non-planar surface increases the friction between the liquid film and the surface of the carrier unit, and prevents the liquid film from falling off or sliding due to shrinkage along its width direction. On the other hand, the non-planar surface reduces the area of the surface of the carrier unit that directly contacts with the liquid film and facilitates the removal of the prepared porous membrane from the mold.

In an embodiment of the present disclosure, the surface of the carrier unit in contact with the liquid film includes anti-slip structures and/or liquid storage structures, for forming a carrier surface with a plurality of solid regions and a plurality of non-solid regions between the liquid film and the carrier unit.

In an embodiment of the present disclosure, the non-solid region includes a liquid region and/or a gas region.

The solid region refers to a carrier surface region in which the liquid film directly contacts the carrier unit, and the non-solid region refers to a carrier surface region in which the liquid film is not in direct contact with the carrier unit. In the conveying process, the liquid storage structure helps the carrier unit to bring liquid from the gelling bath to form a liquid region. The liquid region helps the pre-solidification of the liquid film and the removal of the porous membrane.

In an embodiment of the present disclosure, the carrier surface includes at least one solid region and at least one gas region.

In an embodiment of the present disclosure, the at least one solid region and the at least one gas region are placed in an alternate manner.

In an embodiment of the present disclosure, the carrier surface includes at least one solid region and at least one liquid region.

In an embodiment of the present disclosure, the at least one solid region and the at least one liquid region are placed in an alternate manner.

In an embodiment of the present disclosure, the anti-slip structure includes projections and/or grooves.

The projection and/or the groove can be fixedly attached to the surface of the carrier unit by additional components or can be integrated with the carrier unit into a single piece, such as the projection or the groove can be formed by a protrusion or an indentation formed on the surface of the carrier unit.

In an embodiment of the present disclosure, the liquid storage structure includes grooves and/or projections with indentations formed at the opposite surface of the projections.

In an embodiment of the present disclosure, the projections include at least one of a ridge, a cylinder, a cone, a truncated cone, a middle spherical frustum, an elliptic cylinder, a needle, a prism, a pyramid, a truncated pyramid, and a curve surface protrusion.

In an embodiment of the present disclosure, the grooves include grooves penetrating the carrier unit, and/or grooves not penetrating the carrier unit.

In an embodiment of the present disclosure, the grooves penetrating the carrier unit are configured in at least one of a comb shape, tooth shape, and hollow-carved shape.

In an embodiment of the present disclosure, the surface of the carrier unit in contact with the liquid film includes a plurality of rectangular grooves, the rectangular grooves include a plurality of first rectangular grooves, the long edges of the first rectangular grooves are parallel to each other and perpendicular to the conveying direction of the liquid film.

In an embodiment of the present disclosure, the rectangular grooves further include a plurality of second rectangular grooves, the long edges of the second rectangular grooves are parallel to each other and parallel to the conveying direction of the liquid film.

In an embodiment of the present disclosure, in the conveying process, the liquid storage structure is kept in a liquid storage state.

In an embodiment of the present disclosure, in the conveying process, the surface of the carrier unit is subjected to a wetting process so that the liquid storage structure is kept in a liquid storage state.

In an embodiment of the present disclosure, the wetting process includes spraying liquid to the surface of the carrier unit.

In an embodiment of the present disclosure, the liquid sprayed to the surface of the carrier unit is water.

In an embodiment of the present disclosure, the transmission unit includes a transmission plate.

In an embodiment of the present disclosure, the carrier unit is integrated with the transmission plate into a single piece, or the carrier unit is fixedly attached to the transmission plate.

In an embodiment of the present disclosure, the transmission unit includes a driving wheel, a transmission chain and/or a transmission belt.

In an embodiment of the present disclosure, the transmission unit further includes a supporting part.

In an embodiment of the present disclosure, the supporting part includes a supporting wheel, a roller or a gear.

By adjusting the number and the positional relationship of the transmission units, the conveying path of the liquid film can be changed, and a multi-level solidification can be realized, i.e., let the liquid film pass through multiple gelling baths with different concentrations.

In an embodiment of the present disclosure, the carrier unit is located on a chain link of the transmission chain.

In an embodiment of the present disclosure, the carrier unit is integrated with the chain link of the transmission chain into a single piece or the carrier unit is fixedly attached to the chain link of the transmission chain.

In an embodiment of the present disclosure, the chain link includes a chain plate.

In an embodiment of the present disclosure, the carrier unit is integrated with the chain plate into a single piece or the carrier unit is fixedly attached to the chain plate.

In an embodiment of the present disclosure, the carrier unit is integrated with the transmission belt into a single piece or the carrier unit is fixedly attached to the transmission belt.

The conveying apparatus includes a plurality of carrier units with same surface structures, or a plurality of carrier units with different surface structures.

In an embodiment of the present disclosure of the present disclosure, the surface of the first carrier in contact with the liquid film has an arbitrary point A, the surface of the second carrier in contact with the liquid film has an arbitrary point B, in the conveying process of the liquid film, the distance between the point A and the point B is changed.

The distance between the point A and the point B on the carrier unit changes so that the width of the liquid film carried by the carrier unit changes accordingly. The width of the liquid film becomes larger can prevent or compensate the shrinkage of the liquid film in the gelling bath along its width direction. The width of the liquid film becomes smaller can provide a buffer before the liquid film is further stretched.

In an embodiment of the present disclosure, the mass of the aromatic polyamide is 10% to 30% of the mass of the aromatic polyamide solution.

In an embodiment of the present disclosure, the aromatic polyamide has an inherent viscosity of 1.8 to 3.5. In another embodiment of the present disclosure, the aromatic polyamide has an inherent viscosity of 2.0 to 3.0.

In an embodiment of the present disclosure, the aromatic polyamide solution has a rotational viscosity of 20 to 300 Pa*s. In another embodiment of the present disclosure, the aromatic polyamide solution has a rotational viscosity of 50 to 150 Pa*s.

In an embodiment of the present disclosure, the step for providing the aromatic polyamide solution includes: mixing an aromatic polyamide fiber, a solvent, and a co-solvent together to form an aromatic polyamide solution.

In an embodiment of the present disclosure, the aromatic polyamide fiber is selected from a group consisting of aramid staple fibers and/or aramid fibrids.

In an embodiment of the present disclosure, the solvent is at least one selected from the group consisting of N-methyl pyrrolidone (NMP), N,N-dimethylacetamide (DMAC), N,N-dimethylformamide (DMF), dimethyl sulfoxide (DMSO) and triethyl phosphate (TEP).

In an embodiment of the present disclosure, the co-solvent is at least one selected from the group consisting of sodium chloride, lithium chloride, calcium chloride, and magnesium chloride.

In an embodiment of the present disclosure, the mass of the co-solvent is 0.5% to 8% by mass of the aromatic polyamide fiber. In an embodiment of the present disclosure, the mass of the co-solvent is 1% to 5% by mass of the aromatic polyamide fiber.

In an embodiment of the present disclosure, the steps for providing the aromatic polyamide solution includes: forming an aromatic polyamide solution by the polymerization reaction.

In an embodiment of the present disclosure, the gelling bath includes a first component, and the first component is water.

In an embodiment of the present disclosure, the gelling bath further includes a second component, the second component is at least one selected from the group consisting of N-methyl pyrrolidone, N,N-dimethylacetamide, N,N-dimethylformamide, dimethyl sulfoxide and triethyl phosphate.

In an embodiment of the present disclosure, the mass fraction of water in the gelling bath is 15% to 70%. In another embodiment of the present disclosure, the mass fraction of water in the gelling bath is 25% to 50%. The preferred mass fraction of water in the gelling bath of the present disclosure causes a concentration difference between the gelling bath and the solvent in the film, which causes the formed membrane to have an excellent porous structure.

In an embodiment of the present disclosure, the temperature of the gelling bath is in a range from 5° C. to 50° C. In another embodiment of the present disclosure, the temperature of the gelling bath is in a range from 10° C. to 35° C.

In the present disclosure, the membrane is ready to form an internal porous structure under the synergistic effect of the preferred composition and the controlled temperature of the gelling bath.

In an embodiment of the present disclosure, the time the liquid film conveyed into the gelling bath by the conveying apparatus used to form the pre-formed membrane is in a range from 10 to 300 seconds. In another embodiment of the present disclosure, the time the liquid film conveyed into the gelling bath by the conveying apparatus used to form the pre-formed membrane is in a range from 20 to 100 seconds.

In an embodiment of the present disclosure, the extracting agent is water.

In an embodiment of the present disclosure, the temperature of the extracting agent is in a range from 40° C. to 100° C. In another embodiment of the present disclosure, the temperature of the extracting agent is in a range from 50° C. to 90° C.

In an embodiment of the present disclosure, the porous membrane is dried to obtain the aromatic polyamide porous membrane.

In an embodiment of the present disclosure, the aromatic polyamide porous membrane is obtained by sequentially drying and heat setting the porous membrane.

In an embodiment of the present disclosure, the drying method includes infrared drying and/or blow drying.

In an embodiment of the present disclosure, the drying temperature is in a range from 60° C. to 160° C. In another embodiment of the present disclosure, the drying temperature is in a range from 80° C. to 150° C.

In an embodiment of the present disclosure, the heat setting method includes infrared heat setting.

In an embodiment of the present disclosure, the heat setting temperature is in a range from 180° C. to 300° C. In another embodiment of the present disclosure, the heat setting temperature is in a range from 200° C. to 250° C.

In an embodiment of the present disclosure, in the heat setting process, the aromatic polyamide porous membrane is fixed by a fixture.

The present disclosure provides a lithium-ion secondary battery including the above aromatic polyamide porous membrane.

The aromatic polyamide porous membrane of the present disclosure has good thermal stability and is especially suitable for a high energy density lithium-ion power battery, and greatly improves the thermal runaway temperature of the battery.

In order to make the abovementioned purposes, characteristics, and advantages be more apparent and understandable, detailed descriptions accompanying preferred embodiments are given below.

DETAILED DESCRIPTION OF PREFERRED EMBODIMENTS

Figure 1:
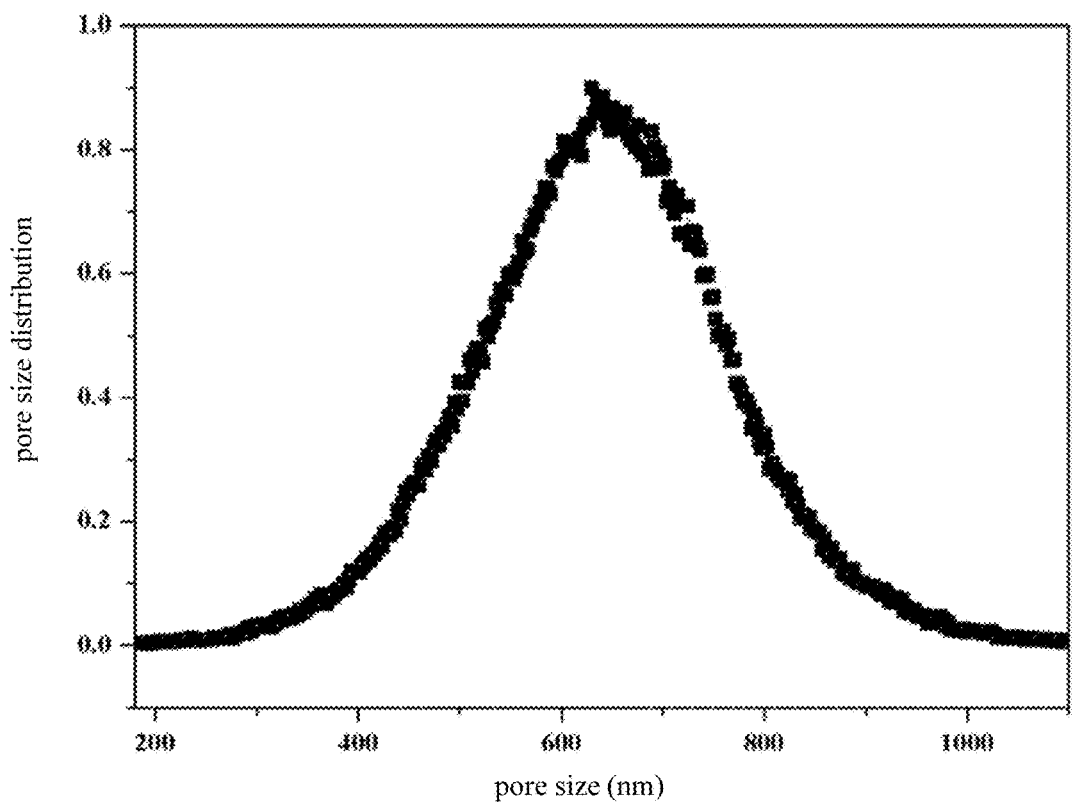
FIG. 1 shows a pore size distribution of one of the surfaces of an aromatic polyamide porous membrane prepared by embodiment 1 of the present disclosure.

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

The test method of the main parameter in the present disclosure is as follows:

Inherent Viscosity Test:

The test instrument is an Ubbelohde viscometer. The test method includes: pipetting 10 ml of DMAc solvent into the Ubbelohde viscometer through a tube A; putting the Ubbelohde viscometer into a thermostatic water bath of 30.0° C.±0.1° C.; keeping the Ubbelohde viscometer in vertical direction and let G ball and E ball of the viscometer completely immerse into the water; clamping the latex tube of tube C by a clamp after the temperature keeps constant; sucking solvent from the latex tube of tube B by the aurilave until the solvent fills half of the G ball; opening the clamp of tube C, recording a time t0 (t0 is not less than 100s) by a stopwatch during which the liquid level of the solvent drops from the upper engraved line a to the lower engraved line b of E ball, repeat measuring for 3 times, and taking the average value to be the outflow time t0 of the DMAc solvent. The referred calculation formula is $\eta\gamma=t/t0$, $\eta sp=\eta\gamma-1$, $[\eta]=\sqrt{2(\eta sp-1n\eta\gamma)}/c$.

Rotational Viscosity Test:

The test instrument is a BROOKFIELD rotational viscometer. The test method includes: pouring a prepared solution into a corresponding stainless steel cup until the liquid level of the solution just immerse the tick mark of the rotating viscometer needle; placing the stainless steel cup on the toolbox and moving it under the needle; slowly adjusting the knob on the right side of the iron frame and turning it counterclockwise until the liquid level of the solution is in the middle of the tick mark; pressing the "start" button to start the test; and checking the percentage value at the lower right corner of the test interface after the reading is stable; if the percentage value is close to 50%, recording three sets of data in one minute, otherwise, pressing the "↑" and "↓" keys to adjust the rotation speed and restarting the test; repeating the foregoing steps until the percentage value is close to 50% and recording the reading. Each sample is tested for three times and an average value is taken as the rotational viscosity.

Porosity Test:

The test method includes: taking three samples in a size of 100 mm×100 mm from the same roll of the separator by a sampling template; weighing the weight and measuring the thickness of the three samples, and taking the average value of the weight and the thickness as the weight W and the thickness D of the sample; calculating the porosity by the calculation formula: $P=(1-(W/\rho/L_{11}\times L_{12}\times D))\times 100\%$, wherein P means the porosity (%), W means the weight (g) of the sample, $\rho$ means the true density (g/cm$^3$) of the sample, $L_{11}$ means the length (mm) of the sample, $L_{12}$ means the width (mm) of the sample, D means the thickness (mm) of the sample.

Gas Permeability Test:

The test instruments are Gurley 4320 and 4110 equipment. The test method includes: taking three samples in a size of 100 mm×100 mm from the same roll of separator by a sampling template; placing the sample on the Gurley 4320 equipment, rotating the knob of the cylinder to 100 cc, aligning the pointer of the knob with the sensor, and slowly putting down the cylinder to ensure it falls smoothly until the Gurley 4110 equipment automatically timed; recording the data and calculating the average of the recorded data.

Figure 9:
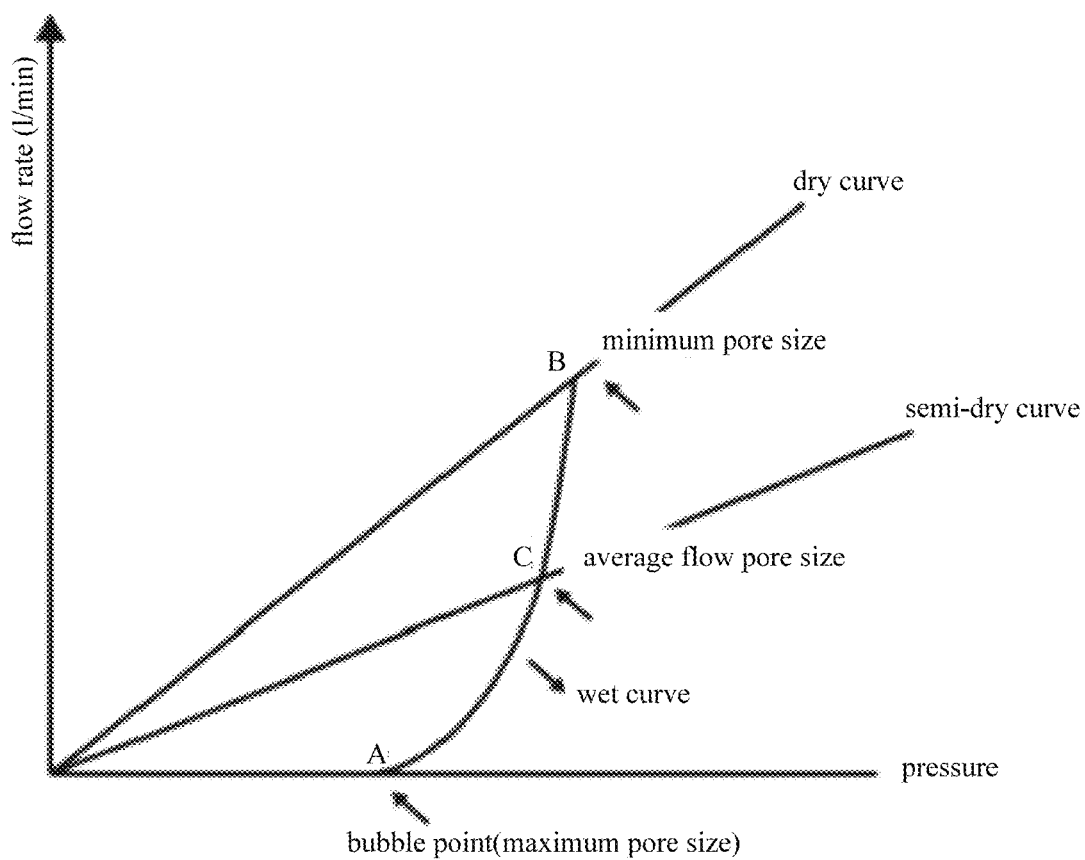
FIG. 9 is a graph showing the relationship between pressure and flow rate in the pore size test of the aromatic polyamide porous membrane prepared by embodiment 1 of the present disclosure.

Cross-Section Pore Size Distribution Test:

The test method includes: performing a wet test of the sample impregnated with the aqueous solution at first and obtaining a corresponding curve (that is, a "wet curve") showing a relationship between the gas flow rate and the applied pressure. After the wet test, performing a dry test of the same sample and obtaining a "dry curve" similar to the wet curve. A semi-dry curve is obtained by dividing the flow rate corresponding to the applied pressure in the "dry curve" by 2, and the semi-dry curve is also shown in FIG. 9. In FIG. 9, all of the three curves contain some information about the characteristics of the pores of the sample: the maximum pore size (also named bubble point) is recorded at point A where flow appears in the wet curve, if the wet curve and the dry curve has a coincident point B (which is named as the minimum pore size point), it means that the infiltrate in all of the pores has been emptied, and the point B corresponds to the through hole where the infiltrate is emptied at the maximum pressure, so it represents the minimum pore size. The point C where the semi-dry curve intersects with the wet curve is named as the average flow pore size point, and the flow rate at point C is 50% of that of the dry curve. Besides these specific points, a cumulative distribution curve of a specific pore size can be calculated by the accumulated flow. Another information can be obtained from the measurements is to calculate the pore size distribution by calculating the flow change of unit pore size according to a formula: $D=4\gamma \cos \theta/p$, wherein D means pore throat diameter, $\gamma$ means liquid surface tension, $\theta$ means liquid contact angle, P means gas pressure.

The curve showing the corresponding relationship between the measured pressure and the flow rate shown in FIG. 9 can be used to calculate the pore throat diameter, the pore size distribution, and the gas permeability. The pores in this equation are assumed to be a cylindrical pore, and a pore shape factor suitable for membranes and other materials is provided by a built-in CAPWIN software of the instrument to solve a multiple Washburn equation and obtain a pore characterized data that is closer to a real state. The pore distribution calculation equation is: $f=-d[(fw/fd)\times 100]/dD$, wherein fw means wet sample flow rate, fd means dry sample flow rate.

Surface Pore Size Distribution Test:

The test instrument is an Atomic Force Microscope (Scanning Probe Microscope, Multimode 8, Bruker), which could steadily achieve an atomic resolution, with the Z-direction noise level less than 0.03 nm. The atmospheric ambient temperature is controlled in a range from −35° C. to 250° C., the liquid environment is in a range from 4° C. to 50° C., and the scan range is 125 µm×125 µm×5 µm (J Scanner), or 10 µm×10 µm×2.5 µm (E Scanner).

Heat Shrinkage Test:

The test method includes: Taking three samples in a size of 100 mm×100 mm from the same roll of the separator by a sampling template; marking the longitudinal length and the lateral length of the separator on the surface of the sample and recording the lengths as L0 and T0; packing the samples by prepared aluminum foils and placing the packages in a vacuum oven, setting the temperature and measuring the longitudinal and the lateral lengths of the sample after heating for 1 hour, and recording the lengths as L' and T; calculating the heat shrinkage rate according to formula: $\Delta L=(L0-L')/L0\times 100\%$, $\Delta T=(T0-T)/T0\times 100\%$, wherein L0, T0 means initial length (mm) of the sample; L', T means the lengths (mm) of the sample after heating, MD means longitudinal stretching and TD means transverse stretching.

Figure 8:
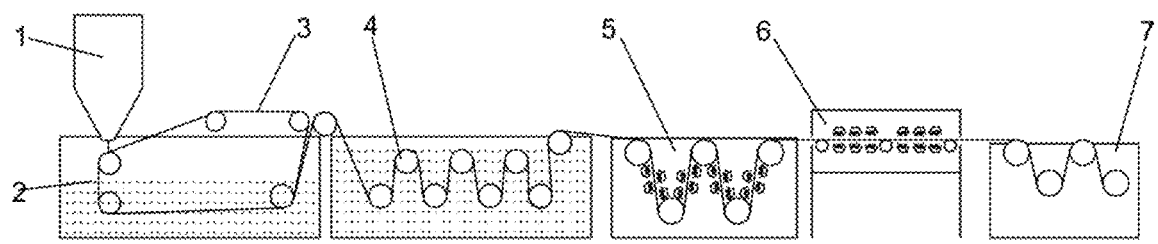
FIG. 8 is a flow chart showing the preparation of the aromatic polyamide porous membrane of the present disclosure.

Battery Preparation:

The positive electrode is made of $LiNi_{0.6}Co_{0.2}Mn_{0.2}O_2$ (NCM622) with high nickel content; the negative electrode is made of carbon-based materials, including at least one of graphite (artificial graphite, natural graphite), mesocarbon micro-beads and amorphous carbon (hard carbon, soft carbon), and the separator is the membrane prepared in the embodiments of the present disclosure. The wrapped battery cell is placed in an aluminum plastic film, and a 15 Ah laminated pouch battery is formed by formatting and grading after electrolyte injection (the electrolyte is EC, DEC, and DMC solvent, and VC and electrolyte salt $LiPF_6$ are added to form a non-aqueous electrolyte having a lithium salt concentration of 1.0 mol/L), the normal temperature 1 C discharge energy density of the battery is about 170 Wh/kg. FIG. 8 is a flow chart showing the preparation of the aromatic polyamide porous membrane of the present disclosure.

Thermal Runaway Test:

The test method includes: 1 C charging of the 15 Ah battery to 4.3V and 15 Ah, clamping the battery by a heating plate, continue heating to 300° C. in 100 watts of power, keeping the battery at this temperature for 30 minutes, then removing the heating plate and recording the temperature rise curve.

The comparative polyolefin separator used in the present disclosure is produced by W-scope Group, the polyethylene ceramic double-sided coating separator is produced by Hebei Jinli New Energy Technology Co., Ltd., the polyethylene aramid single-sided coating separator is manufactured by Asahi Kasei Co., Ltd., and the non-woven separator is produced by the Freudenberg Group.

Embodiment 1

Figure 2:
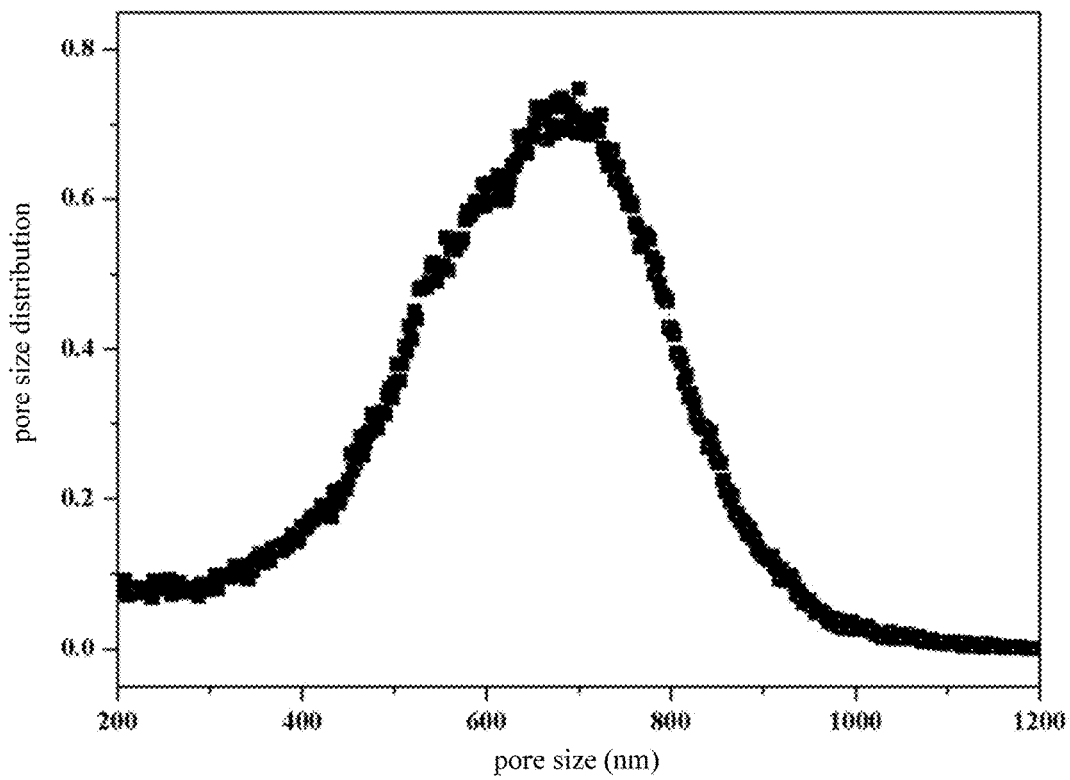
FIG. 2 shows a pore size distribution of the other one of the surfaces of the aromatic polyamide porous membrane prepared by embodiment 1 of the present disclosure.
Figure 3:
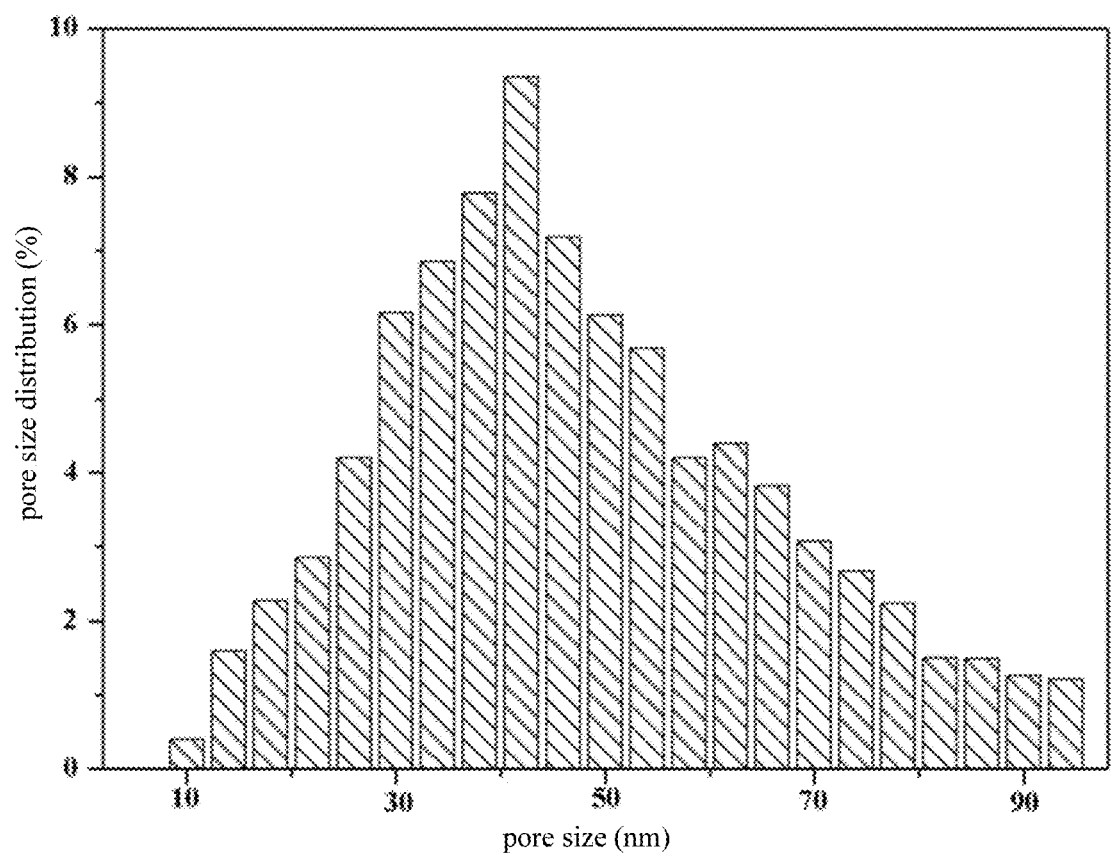
FIG. 3 shows a pore size distribution of a cross-section of the aromatic polyamide porous membrane prepared by embodiment 1 of the present disclosure.
Figure 4:
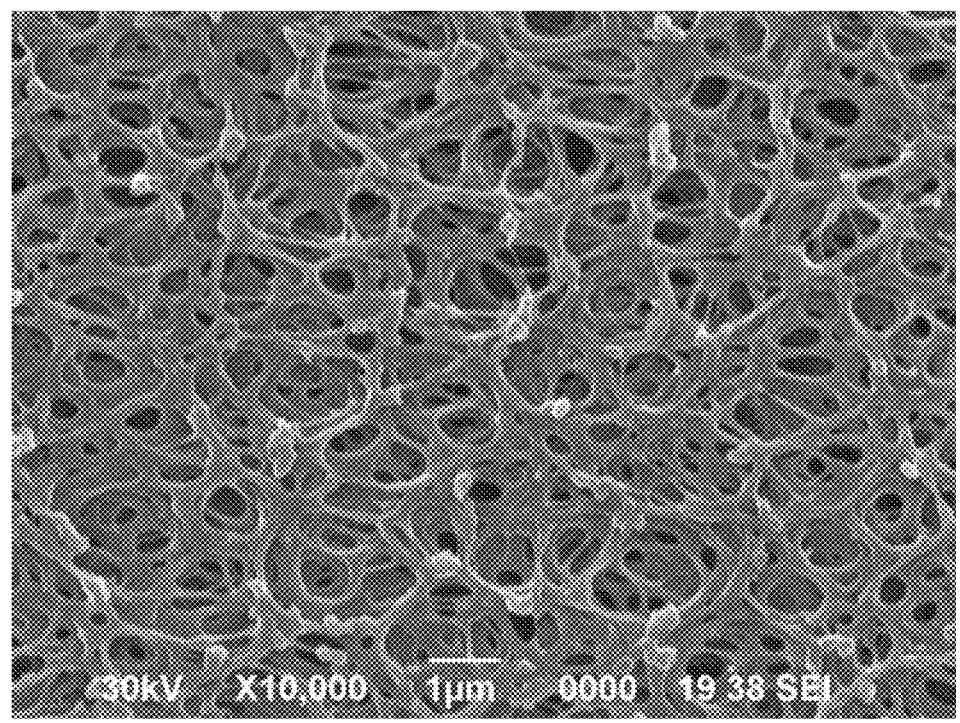
FIG. 4 is a SEM (scanning electron microscope) image showing one of the surfaces of the aromatic polyamide porous membrane prepared by embodiment 1 of the present disclosure.
Figure 5:
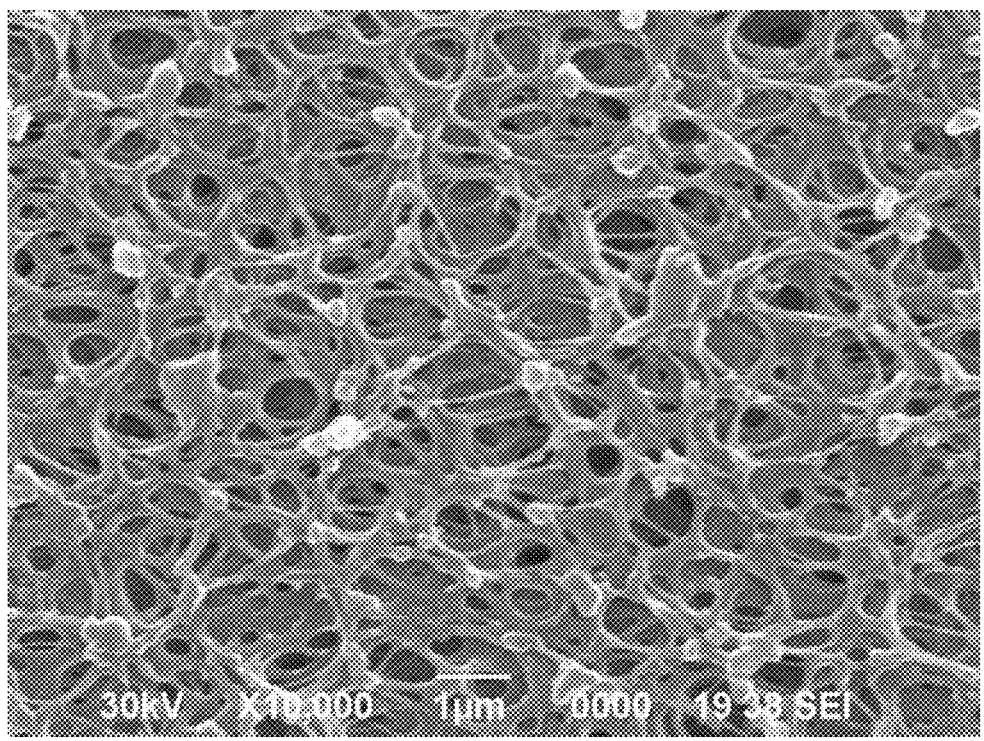
FIG. 5 is a SEM image showing the other one of the surfaces of the aromatic polyamide porous membrane prepared by embodiment 1 of the present disclosure.
Figure 6:
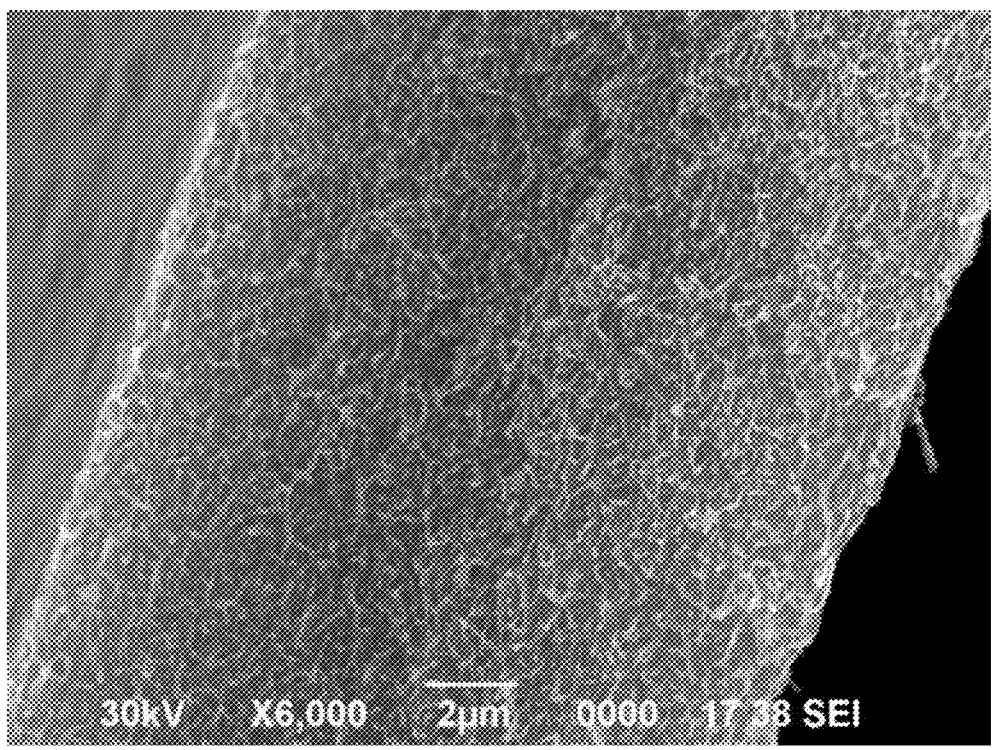
FIG. 6 is a SEM image showing a cross-section of the aromatic polyamide porous membrane prepared by embodiment 1 of the present invention.

Obtaining 8000 g of poly(m-phenylene isophthalamide) solution having an inherent viscosity of 2.0 by a polymerization reaction in a reactor. The solvent is DMF, the mass percent concentration of the polymer is 30%, and the rotational viscosity of the polymer solution is 300 Pa·s. After being defoamed, the solution is extruded through a die to form a liquid film having a width L of 60 cm. The two opposite edges of the liquid film are contacted with a polytetrafluoroethylene transmission chain, and the width $L_1$ of the polytetrafluoroethylene is 7.5 cm, the width $L_2$ of the liquid film portion in contact with the transmission chain is 2.5 cm. The liquid film is brought into a gelling bath by gear transmission and precipitated to form a pre-formed membrane, and the temperature of the gelling bath is 10° C., the gelling time is 100s, and the mass percent concentration of water in the gelling bath is 25%. Next, the pre-formed membrane is transferred into an extraction tank by the transmission chain, and the solvent is extracted by water and a porous membrane is obtained. The temperature of the extraction tank is 40° C. The porous membrane is blow-dried at a temperature of 60° C., and finally enters a high-temperature setting box and finalizes at a temperature of 250° C. After removing the static electricity, the porous membrane is wound and an aromatic polyamide porous membrane coil is obtained. The aromatic polyamide porous membrane is measured to have a gas permeability of 30 sec/100 cc and a porosity of 70%. The heat shrinkage test data is shown in Table 1. The pore size distribution and the SEM image of one of the surfaces of the aromatic polyamide porous membrane prepared in this embodiment are shown in FIG. 1 and FIG. 4, respectively, and the measured average pore size is 0.61 μm. The pore size distribution and the SEM image of the other one of the surfaces of the aromatic polyamide porous membrane prepared in this embodiment are shown in FIG. 2 and FIG. 5, respectively, and the measured average pore size is 0.58 μm. The distribution of the pores in the cross-section of the aromatic polyamide porous membrane is measured as follows: the area occupied by pores of SET (I) of the pore size distribution is 97% of the total area of the pores distributed in the cross-section of the aromatic polyamide porous membrane, the area occupied by pores of SET (II) of the pore size distribution is 2% of the total area of the pores distributed in the cross-section of the aromatic polyamide porous membrane, the area occupied by pores of SET (III) of the pore size distribution is 1% of the total area of the pores distributed in the cross-section of the aromatic polyamide porous membrane, details are shown in FIG. 3.

Battery preparation: The positive electrode is made of high nickel content $LiNi_{0.6}Co_{0.2}Mn_{0.2}O_2$ (NCM622); the negative electrode is made of soft carbon, and the separator is the membrane prepared in the embodiment of the present disclosure. The wrapped battery is placed in an aluminum plastic film, and a 15 Ah laminated pouch battery is formed by formatting and grading after electrolyte injection (the electrolyte is EC, DEC, and DMC solvent, and VC and electrolyte salt $LiPF_6$ are added to form a non-aqueous electrolyte having a lithium salt concentration of 1.0 mol/L), the normal temperature 1 C discharge energy density of the battery is about 170 Wh/kg.

Figure 7:
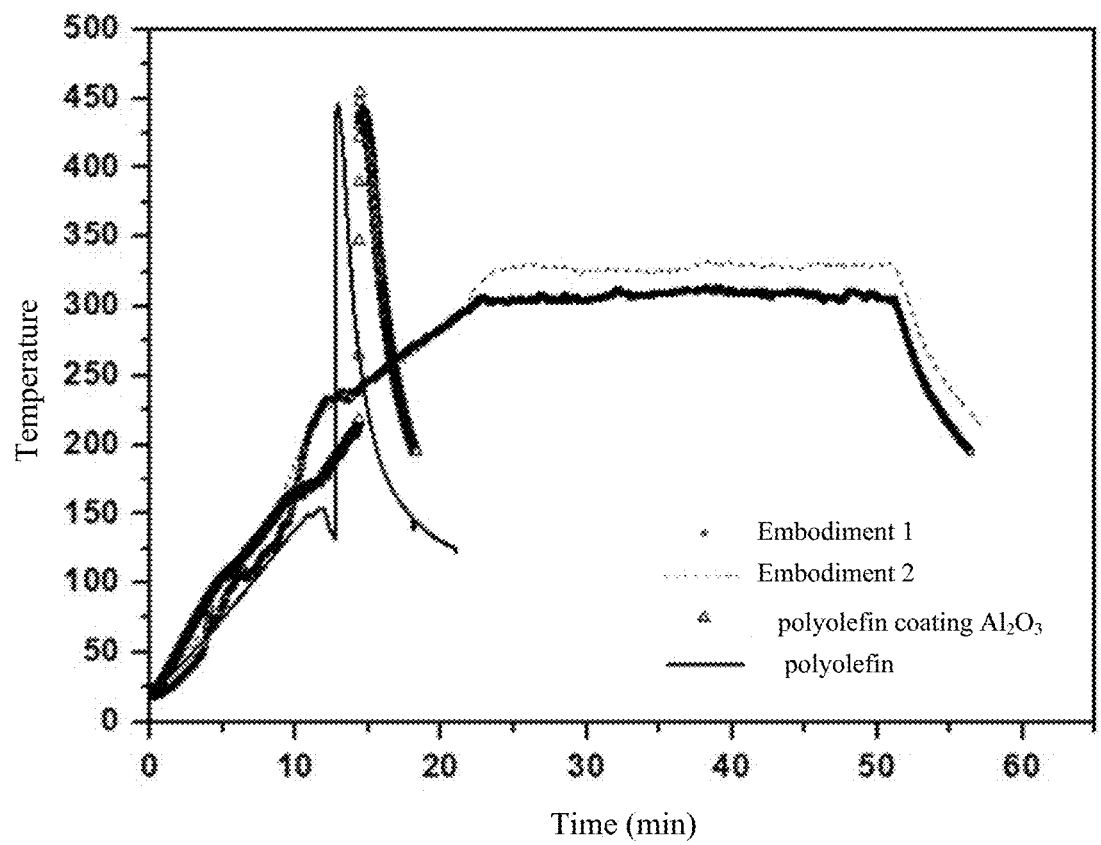
FIG. 7 is an image showing a comparative thermal runaway data of a polyolefin separator and an aromatic polyamide porous membrane prepared by embodiment 1 and embodiment 2 of the present disclosure.

Thermal runaway test: As shown in FIG. 7, the battery is heated to a temperature of 305° C. and maintained at this temperature for 30 minutes, the battery is not out of control, no smoke and no burning phenomenon.

Embodiment 2

Obtaining 8000 g of poly(m-phenylene isophthalamide) solution having an inherent viscosity of 2.0 by a polymerization reaction in a reactor. The solvent is DMF, the mass percent concentration of the polymer is 30%, and the rotational viscosity of the polymer solution is 50 Pa*s. After being defoamed, the solution is extruded through a die to form a liquid film having a width L of 60 cm. The two opposite edges of the liquid film are contacted with a polytetrafluoroethylene transmission chain, and the width $L_1$ of the polytetrafluoroethylene transmission chain is 1.2 cm, the width $L_2$ of the liquid film portion in contact with the transmission chain is 1.2 cm. The liquid film is brought into the gelling bath by gear transmission and precipitated to form a pre-formed membrane, and the temperature of the gelling bath is 50° C., the gelling time is 10s, and the mass percent concentration of water in the gelling bath is 70%. Next, the pre-formed membrane is transferred into an extraction tank by the transmission chain, and the solvent is extracted by water and a porous membrane is obtained, and the temperature of the extraction tank is 50° C. The porous membrane is blow-dried at a temperature of 120° C., and finally enters a high-temperature setting box and finalizes at a setting temperature of 180° C. After removing the static electricity, the porous membrane is wound and an aromatic polyamide porous membrane coil is obtained. The aromatic polyamide porous membrane is measured to have a gas permeability of 200 sec/100 cc and a porosity of 45%. The heat shrinkage test data is shown in Table 1. The average pore size of one of the two surfaces of the aromatic polyamide porous membrane prepared in this embodiment is 0.52 μm. The average pore size of the other one of the surfaces of the aromatic polyamide porous membrane prepared in this embodiment is 0.50 μm. The distribution of the pores in the cross-section of the aromatic polyamide porous membrane is measured as follows: the area occupied by pores of SET (I) of the pore size distribution is 97% of the total area of the pores distributed in the cross-section of the aromatic polyamide porous membrane, the area occupied by pores of SET (II) of the pore size distribution is 2% of the total area of the pores distributed in the cross-section of the aromatic polyamide porous membrane, the area occupied by pores of SET (III) of the pore size distribution is 1% of the total area of the pores distributed in the cross-section of the aromatic polyamide porous membrane.

Battery preparation: The positive electrode is made of high nickel content $LiNi_{0.6}Co_{0.2}Mn_{0.2}O_2$ (NCM622); the negative electrode is made of soft carbon, and the separator is the membrane prepared in the embodiment of the present disclosure. The wrapped battery is placed in an aluminum plastic film, and a 15 Ah laminated pouch battery is formed by formatting and grading after electrolyte injection (the electrolyte is EC, DEC, and DMC solvent, and VC and electrolyte salt $LiPF_6$ are added to form a non-aqueous electrolyte having a lithium salt concentration of 1.0 mol/L), the normal temperature 1 C discharge energy density of the battery is about 170 Wh/kg.

Thermal runaway test: As shown in FIG. 7, the battery is heated to a temperature of 330° C. and maintained at this temperature for 30 minutes, the battery is not out of control, no smoke and no burning phenomenon.

Embodiment 3

Obtaining 8000 g of poly(m-phenylene isophthalamide) solution having an inherent viscosity of 3.5 by a polymerization reaction in a reactor. The solvent is DMF, the mass percent concentration of the polymer is 10%, and the rotational viscosity of the polymer solution is 150 Pa*s. After being defoamed, the solution is extruded through a die to form a liquid film having a width L of 60 cm. The two opposite edges of the liquid film are contacted with a polytetrafluoroethylene transmission chain, and the width $L_1$ of the polytetrafluoroethylene is 6 cm, the width $L_2$ of the liquid film portion in contact with the transmission chain is 1.2 cm. The liquid film is brought into the gelling bath by gear transmission and precipitated to form a pre-formed membrane, and the temperature of the gelling bath is 5° C., the gelling time is 300s, and the mass percent concentration of water in the gelling bath is 15%. Next, the pre-formed membrane is passed into an extraction tank through the transmission chain, and the solvent is extracted by water and a porous membrane is obtained. The temperature of the extraction tank is 100° C. The porous membrane is blow-dried at a temperature of 150° C. and finally enters a high-temperature setting box at a setting temperature of 300° C. After removing the static electricity, the porous membrane is wound and an aromatic polyamide porous membrane coil is obtained. The aromatic polyamide porous membrane is measured to have a gas permeability of 350 sec/100 cc and a porosity of 30%. The heat shrinkage test data is shown in Table 1. The average pore size of one of the two surfaces of the aromatic polyamide porous membrane prepared in this embodiment is 1.0 μm. The average pore size of the other one of the two surfaces of the aromatic polyamide porous membrane prepared in this embodiment is 0.99 μm. The distribution of the pores in the cross-section of the aromatic polyamide porous membrane is measured as follows: the area occupied by pores of SET (I) of the pore size distribution is 87% of the total area of the pores distributed in the cross-section of the aromatic polyamide porous membrane, the area occupied by pores of SET (II) of the pore size distribution is 10% of the total area of the pores distributed in the cross-section of the aromatic polyamide porous membrane, the area occupied by pores of SET (III) of the pore size distribution is 3% of the total area of the pores distributed in the cross-section of the aromatic polyamide porous membrane.

Embodiment 4

1000 g of poly(m-phenylene isophthalamide) staple fiber is dissolved in 9000 g of DMAC solvent, and 9 g of lithium chloride is added as a co-solvent to obtain poly(m-phenylene isophthalamide) solution with an inherent viscosity of 2.4. The mass percent concentration of the polymer is 18% and the rotational viscosity of the polymer solution is 80 Pa*s. After being defoamed, the solution is extruded through a die to form a liquid film having a width L of 40 cm, and the two opposite edges of the liquid film are in contact with a stainless steel (SUS316L) transmission chain, and the width $L_1$ of the stainless steel (SUS316L) transmission chain is 4 cm, and the width $L_2$ of the liquid film portion in contact with the transmission chain is 2 cm. The liquid film is brought into the gelling bath by gear transmission and precipitated to form a pre-formed membrane, and the temperature of the gelling bath is 20° C., the gelling time is 30s, and the mass percent concentration of water in the gelling bath is 35%. Next, the pre-formed membrane is passed into an extraction tank through the transmission chain, and the solvent is extracted by water and a porous membrane is obtained. The temperature of the extraction tank is 60° C. The porous membrane is blow-dried at a temperature of 160° C. and finally enters a high-temperature setting box at a setting temperature of 250° C. After removing the static electricity, the porous membrane is wound and an aromatic polyamide porous membrane coil is obtained. The aromatic polyamide porous membrane is measured to have a gas permeability of 120 sec/100 cc and a porosity of 51%. The heat shrinkage test data is shown in Table 1. The average pore size of one of the two surfaces of the aromatic polyamide porous membrane prepared in this embodiment is 0.82 μm. The average pore size of the other one of the two surfaces of the aromatic polyamide porous membrane prepared in this embodiment is 0.78 μm. The distribution of the pores in the cross-section of the aromatic polyamide porous membrane is measured as follows: the area occupied by pores of SET (I) of the pore size distribution is 85% of the total area of the pores distributed in the cross-section of the aromatic polyamide porous membrane; the area occupied by pores of SET (II) of the pore size distribution is 10% of the total area of the pores distributed in the cross-section of the aromatic polyamide porous membrane; the area occupied by pores of SET (III) of the pore size distribution is 5% of the total area of the pores distributed in the cross-section of the aromatic polyamide porous membrane.

Embodiment 5

1200 g of polyphenylsulfone terephthalamide staple fiber is dissolved in 4800 g of DMAC solvent, and 96 g of calcium chloride is added as a co-solvent to obtain polyphenylsulfone terephthalamide solution having an inherent viscosity of 1.8. The mass percent concentration of the polymer is 25% and the rotational viscosity of the polymer solution is 20 Pa*s. After being defoamed, the solution is extruded through a die to form a liquid film having a width L of 40 cm, and the two opposite edges of the liquid film are in contact with a polyolefin transmission chain, and the width $L_1$ of the polyolefin transmission chain is 2 cm. The width $L_2$ of the liquid film portion in contact with the transmission chain is 1 cm. The liquid film is brought into the gelling bath by gear transmission and precipitated to form a pre-formed membrane, and the temperature of the gelling bath is 25° C., the gelling time is 20s, and the mass percent concentration of water in the gelling bath is 50%. Next, the pre-formed membrane is passed into an extraction tank through the transmission chain, and the solvent is extracted by water and a porous membrane is obtained. The temperature of the extraction tank is 90° C. The porous membrane is blow-dried at a temperature of 80° C. and finally enters a high-temperature setting box at a setting temperature of 200° C. After removing the static electricity, the porous membrane is wound and an aromatic polyamide porous membrane coil is obtained. The aromatic polyamide porous membrane is measured to have a gas permeability of 84 sec/100 cc and a porosity of 56%. The heat shrinkage test data is shown in Table 1. The average pore size of one of the two surfaces of the aromatic polyamide porous membrane prepared in this embodiment is 0.52 μm. The average pore size of the other one of the two surfaces of the aromatic polyamide porous membrane prepared in this embodiment is 0.47 μm. The distribution of the pores in the cross-section of the aromatic polyamide porous membrane is measured as follows: the area occupied by pores of SET (I) of the pore size distribution is 90% of the total area of the pores distributed in the cross-section of the aromatic polyamide porous membrane; the area occupied by pores of SET (II) of the pore size distribution is 8% of the total area of the pores distributed in the cross-section of the aromatic polyamide porous membrane; the area occupied by pores of SET (III) of the pore size distribution is 2% of the total area of the pores distributed in the cross-section of the aromatic polyamide porous membrane.

After being defoamed, the solution is extruded through a die to form a liquid film having a width L of 40 cm, and the two opposite edges of the liquid film are in contact with a polyolefin transmission chain, and the width $L_1$ of the polyolefin transmission chain is 3.5 cm. The width $L_2$ of the liquid film portion in contact with the transmission chain is 2 cm. The liquid film is brought into the gelling bath by gear transmission and precipitated to form a pre-formed membrane, and the temperature of the gelling bath is 35° C., the gelling time is 50s, and the mass percent concentration of water in the gelling bath is 40%. Next, the pre-formed membrane is passed into an extraction tank by the transmission chain, and the solvent is extracted by water and a porous membrane is obtained. The temperature of the extraction tank is 60° C. The porous membrane is blow-dried at a temperature of 120° C. and finally enters a high-temperature setting box at a setting temperature of 250° C. After removing the static electricity, the porous membrane is wound and an aromatic polyamide porous membrane coil is obtained. The aromatic polyamide porous membrane is measured to have a gas permeability of 20 sec/100 cc and a porosity of 60%. The heat shrinkage test data is shown in Table 1. The average pore size of one of the two surfaces of the aromatic polyamide porous membrane prepared in this embodiment is 0.42 μm. The average pore size of the other one of the two surfaces of the aromatic polyamide porous membrane prepared in this embodiment is 0.40 μm. The distribution of the pores in the cross-section of the aromatic polyamide porous membrane is measured as follows: the area occupied by pores of SET (I) of the pore size distribution is 86% of the total area of the pores distributed in the cross-section of the aromatic polyamide porous membrane; the area occupied by pores of SET (II) of the pore size distribution is 10% of the total area of the pores distributed in the cross-section of the aromatic polyamide porous membrane; the area occupied by pores of SET (III) of the pore size distribution is 4% of the total area of the pores distributed in the cross-section of the aromatic polyamide porous membrane.

TABLE 1

|  | 90° C., % | | 100° C., % | | 120° C., % | | 150° C., % | | 180° C., % | | 250° C., % | | 300° C., % | |
| --- | --- | --- | --- | --- | --- | --- | --- | --- | --- | --- | --- | --- | --- | --- |
|  | MD | TD | MD | TD | MD | TD | MD | TD | MD | TD | MD | TD | MD | TD |
| embodiment 1 | 0 | 0 | 0.2 | 0.2 | / | / | 0.5 | 0.3 | 0.6 | 0.5 | 1.5 | 1.4 | 1.8 | 1.3 |
| embodiment 2 | 0.2 | 0 | 0.1 | 0.1 | / | / | 0.8 | 0.6 | 0.7 | 0.6 | 1.3 | 1.2 | 1.9 | 1.5 |
| embodiment 3 | 0.1 | 0 | 0.1 | 0.3 | / | / | 0.3 | 0.2 | 0.4 | 0.3 | 1.3 | 1.1 | 1.5 | 1.2 |
| embodiment 4 | 0.2 | 0 | 0.2 | 0 | / | / | 0.4 | 0.2 | 0.6 | 0.5 | 1.1 | 1.2 | 1.7 | 1.5 |
| embodiment 5 | 0 | 0 | 0.2 | 0.1 | / | / | 0.7 | 0.6 | 0.7 | 0.5 | 1.5 | 1.4 | 1.8 | 1.4 |
| embodiment 6 | 0 | 0 | 0.2 | 0 | / | / | 0.3 | 0.1 | 0.3 | 0.3 | 1.6 | 1.3 | 1.8 | 1.6 |
| Polyethylene separator | 2.0 | 0.7 | 11.0 | 16.0 | | | | | separator agglomeration | | | | | |
| Non-woven ceramic separator | 0 | 0 | 0 | 0 | 0.9 | 0 | 1.5 | 0.1 | 1.8 | 1.0 | separator smash | | | |
| Polyethylene ceramic double-sided coating separator | 0 | 0 | 0 | 0 | 1.0 | 1.0 | 1.3 | 1.3 | | | separator smash | | | |
| Polyethylene aramid single-sided coating separator | 1.0 | 0 | 5.0 | 1.5 | 2.0 | 3.0 | 1.8 | 1.3 | | | separator smash | | | |

Embodiment 6

800 g of poly(m-phenylene isophthalamide) staple fiber is dissolved in 3000 g of DMAC solvent, and 40 g of lithium chloride is added as a co-solvent to obtain poly(m-phenylene isophthalamide) solution having an inherent viscosity of 3.0. The mass percent concentration of the polymer is 21%, and the rotational viscosity of the polymer solution is 130 Pa*s.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing aromatic polyamide porous membrane, comprising:
providing an aromatic polyamide solution;
extruding the solution to form a liquid film;
conveying the liquid film into a gelling bath by a conveying apparatus to form a pre-formed membrane, during the conveying process, two opposite edges along the conveying direction of the liquid film being in contact with the conveying apparatus, while other portions of the liquid film being in contact with the gelling bath;
extracting the pre-formed membrane from the solvent by an extracting agent to form a porous membrane.

2. The method according to claim 1, wherein the mass of the aromatic polyamide is 10% to 30% of the mass of the aromatic polyamide solution.

3. The method according to claim 1, wherein the aromatic polyamide has an intrinsic viscosity of 1.8 to 3.5.

4. The method according to claim 1, wherein the aromatic polyamide solution has a rotational viscosity of 20 to 300 Pa*s.

5. The method according to claim 1, wherein the step of providing an aromatic polyamide solution comprises: mixing an aromatic polyamide fiber, a solvent and a co-solvent together to form an aromatic polyamide solution.

6. The method according to claim 5, wherein the aromatic polyamide fiber is selected from a group consisting of aramid staple fibers and/or aramid fibrids, the solvent is at least one selected from the group consisting of N-methyl pyrrolidone (NMP), N,N-dimethylacetamide (DMAC), N,N-dimethylformamide (DMF), dimethyl sulfoxide (DMSO), and triethyl phosphate (TEP), the co-solvent is at least one selected from the group consisting of sodium chloride, lithium chloride, calcium chloride and magnesium chloride.

7. The method according to claim 5, wherein the mass of the co-solvent is 0.5% to 8% of the mass of the aromatic polyamide fiber.

8. The method according to claim 1, wherein the step of providing an aromatic polyamide solution comprises: forming an aromatic polyamide solution by the polymerization reaction.

9. The method according to claim 1, wherein the gelling bath includes a first component, the first component is water, and the mass fraction of the water in the gelling bath is 15% to 70%.

10. The method according to claim 1, wherein the gelling bath further comprises a second component, the second component is at least one selected from the group consisting of N-methyl pyrrolidone, N,N-dimethylacetamide, N,N-dimethylformamide, dimethyl sulfoxide and triethyl phosphate.

11. The method according to claim 1, wherein the temperature of the gelling bath is in a range from 5° C. to 50° C.

12. The method according to claim 1, wherein the time the liquid film conveyed into the gelling bath by the conveying apparatus used to form the pre-formed membrane is in a range from 10 to 300 seconds.

13. The method according to claim 1, wherein the extracting agent is water.

14. The method according to claim 1, wherein the temperature of the extracting agent is in a range from 40° C. to 100° C.

15. The method according to claim 1, wherein the porous membrane is dried to obtain the aromatic polyamide porous membrane.

16. The method according to claim 15, wherein the aromatic polyamide porous membrane is obtained by sequentially drying and heat setting the porous membrane, the drying method comprises infrared drying and/or blow drying, and the drying temperature is in a range from 60° C. to 160° C., the heat setting method is infrared heat setting, the heat setting temperature is in a range from 180° C. to 300° C.

17. The method according to claim 16, wherein in heat setting process, the aromatic polyamide porous membrane is fixed by a fixture.

* * * * *